Oct. 11, 1955 C. G. MOON 2,720,225
THREAD CLAMP FOR LOOMS
Filed June 13, 1952
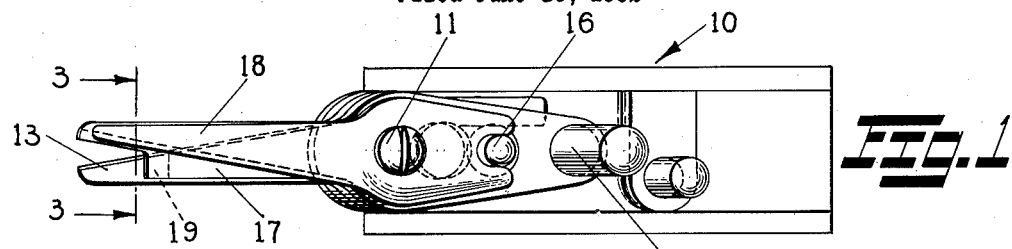
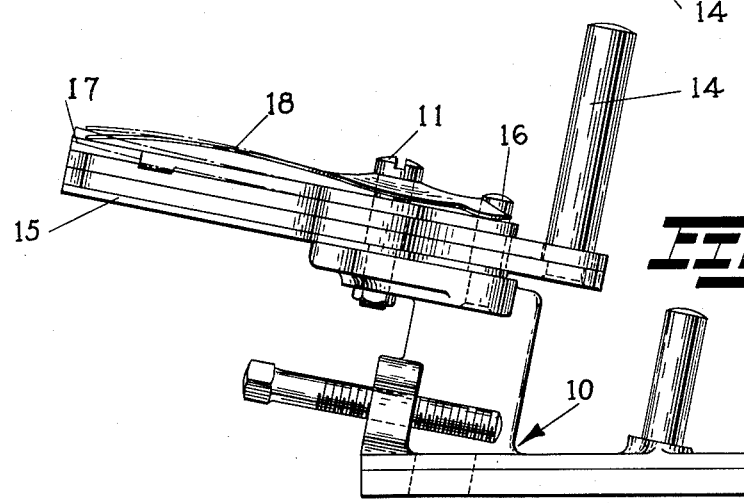
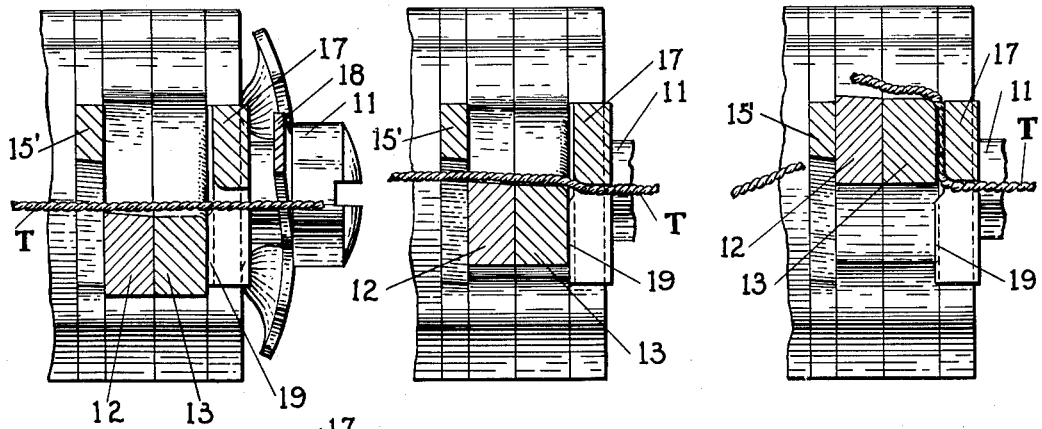
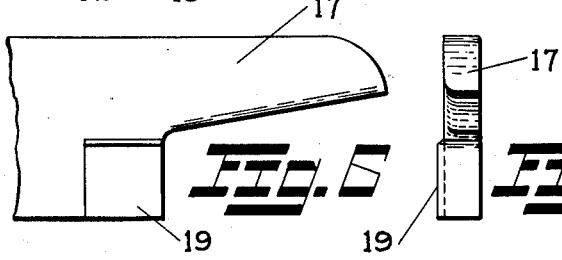
INVENTOR.
CLIFFORD G. MOON
BY
*Rodney C. Southworth*
ATTORNEY United States Patent Office 2,720,225
Patented Oct. 11, 1955

2,720,225

THREAD CLAMP FOR LOOMS

Clifford G. Moon, Hopedale, Mass., assignor to Draper Corporation, Hopedale, Mass., a corporation of Maine Application June 13, 1952, Serial No. 293,283

1 Claim. (Cl. 139—263)

This invention pertains to thread clamping means, and more particularly, to clamping means such as are employed in the cutting and clamping devices for looms, especially for use when weaving glass threads such as Fiberglas.

It is a general object of the invention to devise clamping means for operating in clamping and cutting devices for looms which are particularly adapted to cut and to hold glass threads such as Fiberglas without breaking the material at the clamping point, or without otherwise adversely affecting it or the efficiency of the weaving function.

It is a further and more particular object of the invention to devise thread clamping means for threads such as those herein mentioned which is adapted to clamp and to hold the Fiberglas material without subjecting it to particularly sharp bending action or to a shearing action at the clamping point such as has been and may be tolerated with certain other threads more easily handled.

Other objects will become apparent from the following disclosure.

In looms it is customary at certain points in the weaving cycle as when replenishing the filling in a shuttle, to cut and to clamp an end of thread which must be held for a period of time until released at the next point in the cycle at which the cutting and clamping mechanism is caused to function. For most materials, for example, cotton, wool or most of the synthetic filaments no particular difficulty is experienced, either during the cutting or during the clamping, since those materials have considerable resistance to abrasion or to bending about sharp corners or angles. In practice the clamping action is to a great extent a shearing operation except for the fact that the clamping members are not sharp enough to effect any actual rupturing of the fibers or filaments and therefore they are not severed, but the material itself is jammed between spring-pressed, relatively movable bladelike members which hold it effectively until intentionally released at some subsequent time.

Some of the newer materials such as those formed from glass filaments, for example, Fiberglas, are not advantageously employed, or at least are woven only with considerable difficulty and lack of efficiency due to frequent trouble since the clamping function of the instrumentalities with which we are herein concerned actually severs the thread, or at least some of the filaments thereof, and in many instances functions virtually as a cutter thereby releasing the material rather than holding it as intended.

According to the present invention, clamping members of the conventional type of thread cutter and clamp frequently referred to as a Stafford cutter have been so modified as to obviate the difficulties above mentioned. The operation of the cutter and clamp remains virtually the same and other weaving elements and the general method employed need not be varied at all so that modification of the parts and adoption of the inventive changes hereinafter described in detail make it possible to weave these threads with which great difficulty has heretofore been experienced. The principle applied is that of maintaining the clamping blades or members spaced or separated for at least the thickness of the thread to be held during practically the entire closing movement of the clamping members until a point just prior to completion of that movement at which time the members which are resiliently urged into engagement are released so as to move laterally in the direction of making engagement thereby to clamp and retain the thread until again released. The actual clamping movement is one in which the blade members move laterally toward one another and at a time when the shearing movement incidental to closing the blades has become nearly complete. In actual practice a boss or raised portion is provided on one of the clamping members so positioned and of such extent as to maintain them separated the desired distance during the closing movement so that there is no shearing effect whatsoever upon the thread at that time being engaged or bent angularly by the members preparatory to the final movement at which the said boss or raised element no longer governs and the spring-pressed members move into lateral engagement or as near to complete engagement as they may while pressing and clamping the thread between them. It can be seen that there is thus no actual shearing or abrasion of the surface of the thread during the entire clamping movement and thus the thread which might otherwise become seriously weakened or actually severed at that time is preserved so that the same is held by the clamp until desirably to be released therefrom.

In the following more detailed description the invention is described by reference to one specific embodiment thereof illustrated in the accompanying figures of drawing wherein:

Fig. 1 is a side elevation of a typical Stafford type cutter and clamp to which the invention has been applied.

Fig. 2 is a plan view of the mechanism of Fig. 1.

Figs. 3, 4 and 5 are sections taken at the lines 3—3 in Figs. 1 and 2 and showing three progressive steps during the severing clamping of a thread.

Figs. 6 and 7 are detail views of one of the clamping members showing the raised portion thereof which is characteristic of the invention.

Now referring to Figs. 1 and 2, the invention has been illustrated as applied to a conventional Stafford type cutter a more complete description of which may be had in U. S. Patent 1,883,532, but which is also very commonly known and well understood by those conversant with this art. A sliding bracket or holder generally indicated by numeral 10 carries a pivot 11 on which are pivotally mounted a moving cutter blade 12 and a moving clamping member 13 which extend forwardly of the pivot to mount a pin 14 by which these members are caused to move to and from cutting and clamping relationship with other and fixed members. The fixed cutter blade 15 is also carried by engagement at the pivot 11, but then extends forwardly to be held by a stud or pin 16 which is also fixed in bracket 10. The fixed clamping member 17 is likewise held at the pivot and by pin 16, the ends of these two members either being drilled or slotted so as to be definitely positioned by the pin.

The movable members 12 and 13 are provided with a relatively large aperture concentric with the pin so that they may move throughout the required angular extent. The size of the aperture then serves to limit the amount of movement possible and thus the angular movement which may be imparted to the two members.

The cutter blade 15 is so designed as to have a shearing action against the movable blade 12 and to cut the thread in the usual fashion. The fixed blade 17 which serves in cooperation with blade or member 13 for clamping the thread is spring-pressed by a leaf or other spring 18 which is also held at pivot 11 and is slotted so as to be maintained in proper alignment by its engagement with the end of pin 16. This spring is under sufficient tension to press the blade 17 laterally toward the blade 13 and these members are thus movable in something similar to a shearing action for effecting the clamping of the thread, except for the fact that the corners of the members by which the thread is engaged are rounded so that there would normally be no cutting or shearing, but rather a movement of the movable blade past the other and along the thread until the two had arrived at an overlapping relationship with the thread pinched or held between them.

As before explained, a clamping action of the type in which the thread is engaged as the two members slip past one another while being pressed together by the spring is effective and entirely satisfactory when employed with relatively resistant materials. With the glass fibers which are very easily ruptured or which will not stand severe bending action, the effect of a clamp embodying no further refinement would in many instances be entirely impractical. For the purpose of obviating this difficulty, one of the blades, preferably the fixed blade 17 is provided with a boss or lateral projection indicated by numeral 19 so positioned as to maintain the blade ends at least separated as shown except just as they arrive at substantially the limit of their movement during clamping. The boss 19 should preferably be thick enough or should extend laterally beyond the effective surface of the member 17 so as to separate the blades by at least the thickness of the heaviest thread which is to be encountered. It is so positioned and of such extent that as the movable blade 13 is opened, Figs. 1 and 3, the spring-pressed blade 17 is actually cammed outwardly and will maintain that relationship up to a point where, upon closing, the movable blade merely slips from the boss at just about that point where the clamping movement ceases. At that time the thread will have been bent to conform to the clamping surfaces and the lateral movement of the blade 17 under the influence of spring 18 can have no adverse effect upon it.

Now referring to Figs. 3, 4 and 5, the members are shown in fully open position, Fig. 3, also in Fig. 1, and a thread indicated by the letter T is shown having entered the cutter and clamp and about to be severed and clamped as intended. In Fig. 4 the parts have been moved to a position where the movable clamping member 13 has engaged the thread T and has begun to bend it slightly about the lower surface or edge of the member 17, this actual bending action being entirely practical since there is no abrasion, crushing or other tendency to destroy the fibers from which the thread is comprised. According to the timing of the parts, the cutting function is about to take place.

Now continuing on to Fig. 5, the parts have been moved to their completely closed position and the cutting has been completed while the thread has been clamped between the adjacent lateral surfaces of the members 13 and 17 since the boss 19 is no longer effective to maintain the space or separation between the parts as it did in other positions, for example, Figs. 3 and 4. The boss is bevelled suitably at the points where the movable blade 13 slips from it thereby permitting spring 18 to force the member 17 into clamping engagement with the thread.

In Figs. 6 and 7 the blade 17 is shown greatly enlarged and the boss 19 correspondingly enlarged is shown in the position and formed to substantially those dimensions which have proved practical in actual operative tests.

The particular cutter and clamping means described is of one type commonly used and the movable parts and so-called fixed parts may well be reversed, the actual operation then being substantially the same except for the reversal. It is also to be understood that the boss 19 could be formed as a part of the movable member and the parts otherwise modified so that the control would then be effected by a projection from the opposite clamping part or member, that also being an obvious change or reversal which could be availed of if desired.

It is to be understood that the clamping members as modified to embody the invention may be utilized at other points in the loom and that the advantages derived from the employment thereof are equally applicable to other cutters and/or clamping mechanism whether employed in a unit combining both functions and elements, or where a binder may be used alone. Clamps and cutters are also employed in other types of looms, for example, shuttleless looms and those used for weaving different fabrics in which the cutting function may not necessarily be one directly associated with filling drawn from a shuttle by which the filling is actually carried. The invention applies likewise to the use of such mechanisms in all types of looms.

While glass threads are cited as an example of a material now becoming common and for which the invention is most advantageously employed, it is to be understood that there are other materials, both natural and synthetic which, due to their fineness, general lack of strength or delicate and unpredictable nature when stressed or bent sharply, are more effectively woven when the clamp herein described and claimed is used. Of course, it may be used with practically all weaving materials although with most it is not necessary.

While one embodiment of the invention has been disclosed, it is to be understood that the inventive concept may be carried out in a number of ways. The invention is, therefore, not to be limited to the precise details described, but is intended to embrace all variations and modifications thereof falling within the spirit of the invention and the scope of the claim.

I claim:

A thread cutter and clamp for looms having in combination pivotal members comprising cutting blades and adjacent clamping members, one of said clamping members being movable to and from a position of clamping relationship to the other, a spring for pressing one of the clamping members laterally toward the other, one said clamping member being relatively long and tapering to a relatively narrow point for insertion into a thread cutter slot in a shuttle, the other and cooperating member being of substantially the same length and of substantially double the width of the end of the first member up to a point spaced from the end of the member about the distance the cutter and clamp enters the shuttle in picking up a thread, and of only the width of the tapered end of that member first mentioned from that point thereby to form a shoulder limiting the extent of the thread receiving divergent space between opened clamping members, and a boss raised from the second mentioned member at the side thereof adjacent the cooperating member and positioned adjacent the said shoulder and of extent slightly less than the width of the member first mentioned at the area of engagement so that as the members are opened the boss maintains them spaced during the clamping movement, but moves out of contact with and entirely beyond the first member just before the completion of the closing movement of the members.

References Cited in the file of this patent

UNITED STATES PATENTS

| | | |
|---|---|---|
| 1,552,010 | Rhoades | Sept. 1, 1925 |
| 1,883,532 | Burdett | Oct. 18, 1932 |